(12) United States Patent
Yokoyama et al.

(10) Patent No.: US 10,870,356 B2
(45) Date of Patent: Dec. 22, 2020

(54) VEHICLE-SPEED CONTROL DEVICE

(71) Applicant: Mitsubishi Electric Corporation, Chiyoda-ku (JP)

(72) Inventors: Kazuto Yokoyama, Chiyoda-ku (JP); Masahiro Iezawa, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/761,159

(22) PCT Filed: Sep. 12, 2016

(86) PCT No.: PCT/JP2016/076760
§ 371 (c)(1),
(2) Date: Mar. 19, 2018

(87) PCT Pub. No.: WO2017/073184
PCT Pub. Date: May 4, 2017

(65) Prior Publication Data
US 2018/0264950 A1 Sep. 20, 2018

(30) Foreign Application Priority Data
Oct. 26, 2015 (JP) .................................. 2015-209539

(51) Int. Cl.
*B60L 9/18* (2006.01)
*B60L 15/20* (2006.01)
(Continued)

(52) U.S. Cl.
CPC ................. *B60L 9/18* (2013.01); *B60L 15/20* (2013.01); *B60L 15/2045* (2013.01); *H02P 5/50* (2013.01);
(Continued)

(58) Field of Classification Search
CPC ........ B60L 9/18; B60L 15/2045; B60L 15/20; B60L 2240/423; B60L 2240/421;
(Continued)

(56) References Cited

U.S. PATENT DOCUMENTS 6,401,016 B1 * 6/2002 Yoshino .................. B60K 6/46
701/22
7,733,047 B2 * 6/2010 Ikeda ....................... H02P 5/00
318/432
(Continued)

FOREIGN PATENT DOCUMENTS

CN 103038092 A 4/2013
DE 10 2007 017 821 A1 10/2008
(Continued)

OTHER PUBLICATIONS

International Search Report dated Nov. 22, 2016, in PCT/JP2016/076760, filed Sep. 12, 2016.
(Continued)

*Primary Examiner* — Angelina Shudy
*Assistant Examiner* — Mohamed Abdo Algehaim
(74) *Attorney, Agent, or Firm* — Xsensus LLP

(57) ABSTRACT

A vehicle speed control unit includes feedback control parts, the number of feedback control parts corresponding to the number of multiple motors, generating feedback command torques for the respective motors, on the basis of respective deviations between speed signals from speed sensors detecting revolution speeds of the multiple motors and feedback target vehicle-speed signal reshaped from the inputted target vehicle-speed signal by target vehicle-speed filters; a feedforward control part calculating a feedforward command torque for the vehicle as a whole, on the basis of the inputted target vehicle-speed signal; and a torque distribution part dividing the feedforward command torque into individual
(Continued)

feedforward command torques for distribution to the respective motors, wherein the individual feedforward command torques are respectively added to the feedback command torques and, to control the respective motors.

13 Claims, 15 Drawing Sheets

(51) Int. Cl.
    *H02P 5/50*     (2016.01)
    *H02P 5/51*     (2016.01)
    *B60W 10/08*     (2006.01)
    *B60W 30/20*     (2006.01)

(52) U.S. Cl.
    CPC ............. *H02P 5/51* (2016.02); *B60L 2220/42* (2013.01); *B60L 2240/421* (2013.01); *B60L 2240/423* (2013.01); *B60W 10/08* (2013.01); *B60W 30/20* (2013.01); *Y02T 10/72* (2013.01)

(58) Field of Classification Search
    CPC ... B60L 2220/42; B60W 10/08; B60W 30/20; B60W 50/038; B60W 2050/0008; B60W 2050/0052; H02P 5/51; H02P 5/50; Y02T 10/7258
    USPC .......................................................... 701/22
    See application file for complete search history.

(56) References Cited

U.S. PATENT DOCUMENTS

| | | | | |
|---|---|---|---|---|
| 8,587,237 B2* | 11/2013 | Kobayashi | ............... | B60K 6/48 318/400.23 |
| 2003/0201131 A1* | 10/2003 | Maekawa | ............... | B60K 17/35 180/249 |
| 2004/0176899 A1* | 9/2004 | Hallowell | ................ | B60K 6/52 701/84 |
| 2007/0198153 A1* | 8/2007 | Oya | ..................... | B62D 5/0463 701/41 |
| 2008/0264709 A1* | 10/2008 | Fenker | ............... | B60K 23/0808 180/197 |
| 2009/0088919 A1* | 4/2009 | Muta | ........................ | B60K 6/44 701/69 |
| 2009/0175601 A1* | 7/2009 | Ikeda | ....................... | H02P 5/00 388/800 |
| 2010/0174463 A1* | 7/2010 | Uragami | ............... | B60T 8/1755 701/70 |
| 2011/0160963 A1* | 6/2011 | Yasui | .................. | B62D 11/003 701/41 |
| 2012/0065821 A1* | 3/2012 | Hessell | ................... | B60L 58/20 701/22 |
| 2012/0081051 A1* | 4/2012 | Kobayashi | ............... | B60K 6/48 318/400.23 |
| 2013/0057191 A1* | 3/2013 | Yoshiura | ................. | H02P 23/04 318/600 |
| 2013/0231838 A1* | 9/2013 | Shiozawa | ............... | B60L 3/102 701/70 |
| 2014/0330469 A1* | 11/2014 | Yoshida | .................. | B60L 50/16 701/22 |
| 2015/0039164 A1* | 2/2015 | Onodera | ................. | B60L 15/20 701/22 |
| 2015/0090507 A1* | 4/2015 | Okada | ................. | B66F 9/07568 180/65.51 |
| 2015/0180386 A1* | 6/2015 | Enoki | ....................... | H02P 6/10 318/400.23 |
| 2015/0224845 A1* | 8/2015 | Anderson | ............ | B60G 17/052 701/37 |
| 2015/0298577 A1* | 10/2015 | Kobayashi | .............. | B60L 15/20 701/22 |
| 2016/0159352 A1* | 6/2016 | Kim | .................... | B60W 30/143 701/94 |
| 2016/0176313 A1* | 6/2016 | Li | ......................... | B60L 15/025 701/22 |
| 2016/0233808 A1* | 8/2016 | Yoshiura | ................. | H02P 23/14 |
| 2018/0154797 A1* | 6/2018 | Sawada | ............... | B60L 15/2009 |
| 2018/0319397 A1* | 11/2018 | Ohta | ...................... | B60K 31/00 |

FOREIGN PATENT DOCUMENTS

| | | | | |
|---|---|---|---|---|
| JP | 7-322417 A | 12/1995 | | |
| JP | 2006-200477 A | 8/2006 | | |
| JP | 2006-264533 A | 10/2006 | | |
| JP | 2006264533 | * 10/2006 | ............ | B60W 30/00 |
| JP | 2007-190941 A | 8/2007 | | |
| JP | 2007190941 | * 8/2007 | .......... | B60K 17/348 |
| JP | 2008-62894 A | 3/2008 | | |
| JP | 2011-114947 A | 6/2011 | | |
| JP | 2011-139561 A | 7/2011 | | |
| JP | 2012-80655 A | 4/2012 | | |
| WO | 2013/190821 A1 | 12/2013 | | |

OTHER PUBLICATIONS

Notification of Reasons for Refusal dated Feb. 3, 2017, in Japanese patent Application 2017-501736.
German Office Action dated May 15, 2019 in Patent Application No. 11 2016 004 894.7, 12 pages (with English translation).
Chinese Office Action dated Jul. 1, 2020, issued in corresponding Chinese Patent Application No. 201680061473.X.

* cited by examiner

— MECHANICAL FORCE TRANSMITTING PATH
------ ELECTRIC POWER TRANSMITTING PATH

VEHICLE-SPEED CONTROL DEVICE

TECHNICAL FIELD

The present invention relates to a vehicle speed control unit for a vehicle that travels by multiple drive motors.

BACKGROUND ART

There has been a control technology, as a drive support system like a cruise control (CC) and an adaptive cruise control (ACC), for a vehicle to automatically follow a target speed set by the system or the operation of a driver. Such a vehicle speed control technology is also used in an automatic driving system. A traditional vehicle provided with multiple drive motors is configured such that when controlling the vehicle speed, a torque distribution calculation part calculates a summation of command torques to be given to the vehicle as a whole and then distributes torques to the respective motors and the engine (for example, Patent Document 1).

Further, there is proposed a method of controlling each motor of an in-wheel motor vehicle, when a speed difference between the inner and outer wheels are developed by a steering operation, on the basis of a driver's accelerator operation such as pressing the accelerator pedal, by combination of a feedforward control and a feedback control (see Patent Document 2).

PRIOR ART DOCUMENTS

Patent Documents

Patent Document 1: JP2008-062894 A, and
Patent Document 2: JP2011-139561 A.

SUMMARY OF THE INVENTION

Problem that the Invention is to Solve

Since the vehicle speed control unit disclosed in Patent Document 1 calculates collectively total command torques to be given to the vehicle as a whole, quickness of the follow-up depends on the setting of the control unit responsible for the collective calculation. However, a vehicle traveling by multiple drive motors has different drivetrains respectively constituted with mechanical components from the motors to the wheels, such as gears and shafts. Parameters for a traditional control unit need to be designed by taking into account the drivetrain whose follow-up performance is difficult to increase. The vehicle speed control unit disclosed in Patent Document 2 also does not take into account difference in the respective drivetrains from the motors to the wheels.

Here, a supplementary explanation is made about the difficulty in increase of the follow-up performance. The follow-up performance refers to quickness of convergence of the vehicle speed rise toward a target speed and quickness of recovery to the target speed when the vehicle speed fluctuates owing to a disturbance. Since the drivetrain of the vehicle is not completely rigid, a vibration due to the resonant characteristic thereof is excited by an input torque having a specific frequency band. A feedback (FB) control is generally used in a vehicle speed control unit, and raising its FB gain increases the follow-up performance. However, since increase in the gain shifts the frequency band of the signal circulating in the FB control loop to a higher frequency region, if the frequency band involves the resonant frequency, vibration of the vehicle body occurs. This leads to degradation in ride quality and breakage of the drivetrain. Thus, the follow-up speed of the control unit needs to be suppressed by taking into account the low resonant frequency of the drivetrain.

The present invention made to overcome the problem described above and aimed at providing a vehicle speed control unit for controlling the speed of a vehicle driven by multiple motors to improve the follow-up performance toward a target speed.

Means for Solving the Problem

According to the present invention, a vehicle speed control unit configured to control multiple motors for driving wheels of a vehicle provided with the multiple motors so that a speed of the vehicle follows a vehicle speed indicated by a target vehicle-speed signal being input, the vehicle speed control unit includes feedback control parts, the number of feedback control parts corresponding to the number of multiple motors, the feedback control parts generating feedback command torques for the respective motors, on the basis of respective deviations between speed signals from speed sensors detecting revolution speeds of the multiple motors and feedback target vehicle-speed signal reshaped from the inputted target vehicle-speed signal by target vehicle-speed filters; a feedforward control part calculating a feedforward command torque for the vehicle as a whole using a transfer function whose input is the inputted target vehicle speed and whose output is a feedforward command torque for the vehicle as a whole, on the basis of the inputted target vehicle-speed signal; and a torque distribution part dividing the feedforward command torque into individual feedforward command torques for distribution to the respective motors, wherein the transfer function is a product of a transfer function of the target vehicle-speed filter multiplied by the inverse model of a transfer function of the vehicle whose input is the summation of forces in the translation direction of the vehicle, and the feedback command torques and the individual feedforward command torques are respectively added, to control the respective motors.

Advantage of the Invention

According to the present invention, speed-feedback control loops are provided for the respective motors, thereby allowing the feedback control parts to be respectively adjusted so as to increase follow-up performance as high as possible depending on resonance characteristics of the drivetrains to the motors. Furthermore, a feedforward control part common to all motors is provided and a torque distribution part divides the feedforward command torque into individual feedforward command torques for distribution to the respective motors depending on a situation, thereby allowing a favorable follow-up performance to be obtained.

EMBODIMENTS FOR CARRYING OUT THE INVENTION

Embodiment 1

Figure 3:
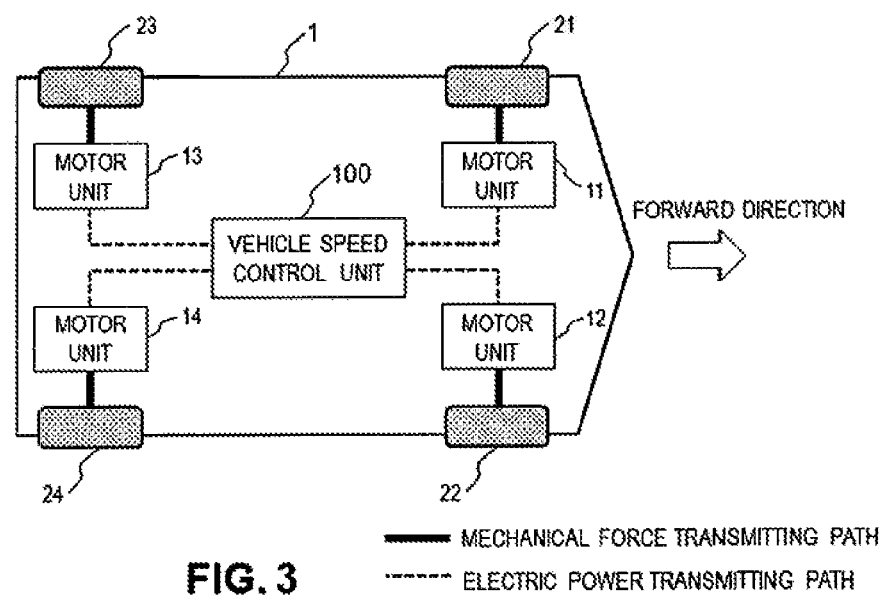
FIG. 3 is a conceptual block diagram showing an example of the configuration of a vehicle to which the vehicle speed control unit of the present invention is applied.
Figure 4:
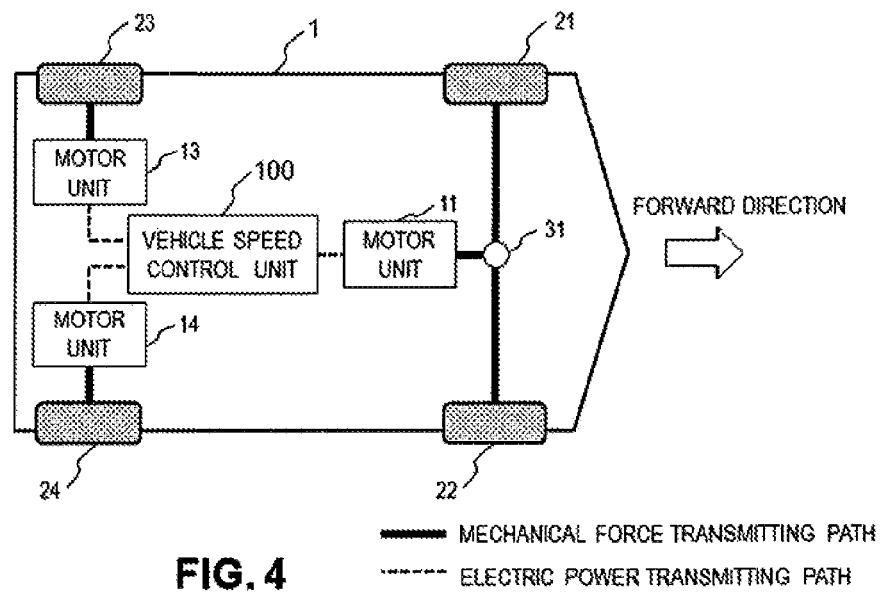
FIG. 4 is a conceptual block diagram showing another example of the configuration of a vehicle to which the vehicle speed control unit of the present invention is applied.
Figure 5:
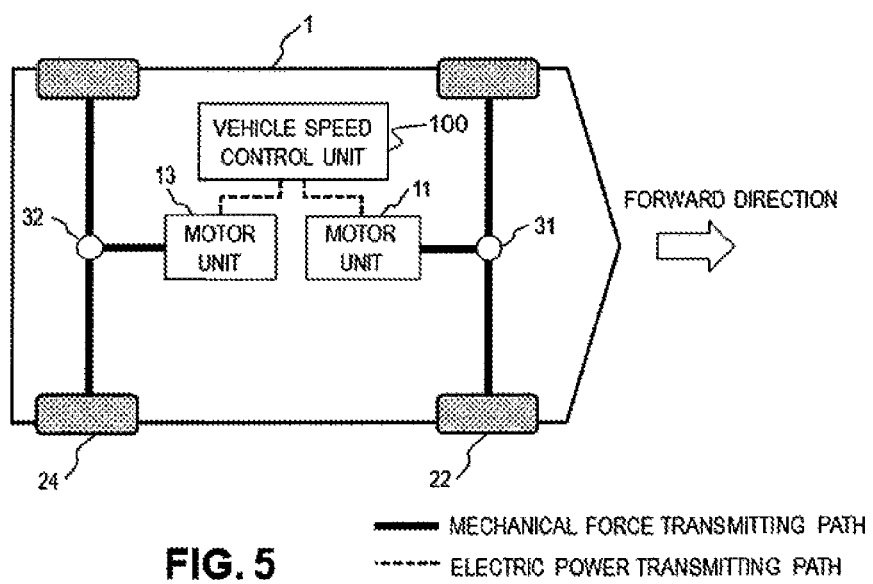
FIG. 5 is a conceptual block diagram showing still another example of the configuration of a vehicle to which the vehicle speed control unit of the present invention is applied.
Figure 6:
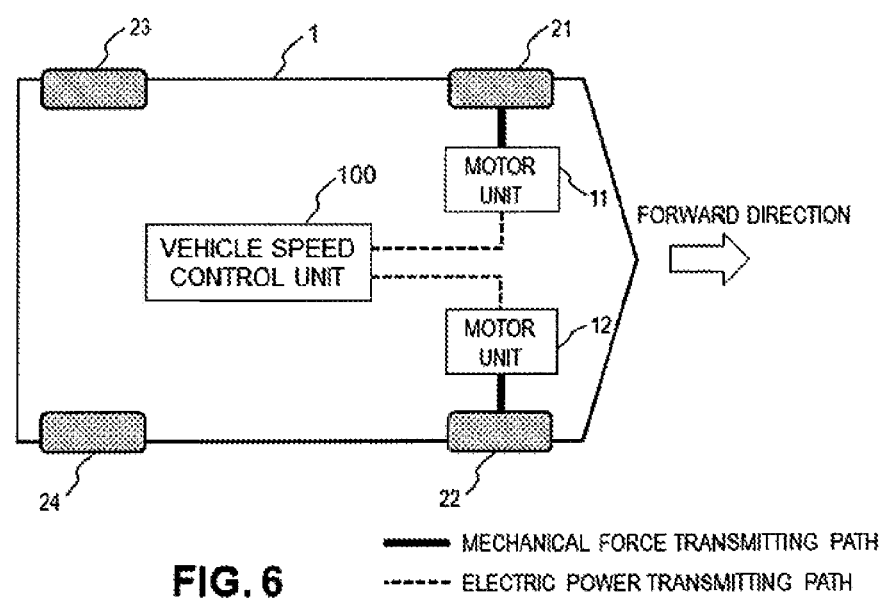
FIG. 6 is a conceptual block diagram showing yet another example of the configuration of a vehicle to which the vehicle speed control unit of the present invention is applied.

FIG. 3 shows an example of a configuration of a vehicle 1 provided with a vehicle speed control unit 100 according to the present invention. The left front wheel 21, the right front wheel 22, the left rear wheel 23, and the right rear wheel 24 are respectively driven by motors in four motor units 11 to 14. Output torques of the motors in the motor units 11 to 14 are respectively transmitted to the wheels 21 to 24 via powertrains each configured with mechanical components such as reduction gears and drive shafts. The motors in the motor units 11 to 14 may be in-wheel motors integrated with the wheels 21 to 24, respectively. A vehicle to which the present invention is applied may have three or two motors, that is, the present invention can be applied to a vehicle provided with multiple motors. A configuration example of the vehicle 1 that has three motors is shown in FIG. 4, in which the motor units 13, 14 are provided for respectively driving the right and left rear wheels 23, 24 and a motor unit 11 for driving the front wheels 21, 22. The output torque of the motor unit 11 is transmitted to the two front wheels 21, 22 via a differential gear 31. In addition, the number of front and rear motors and the powertrain configuration of the vehicle 1 may be front-rear reversible. A configuration example of the vehicle 1 that has two motors is shown in FIG. 5, in which the front wheel motor unit 11 is provided for the front wheels and the rear wheel motor unit 13 for the rear wheels. In this configuration, output torques of the motor units 11, 13 are respectively transmitted to the right and left front wheels 21, 22 and the right and left rear wheels 23, 24 via the differential gears 31, 32. Another configuration example of the vehicle 1 having two motors is shown in FIG. 6, in which the right and left front wheels 21, 22 are respectively driven by the motors in the motor units 11, 12. Hereinafter, the configuration of the vehicle speed control unit 100 is described for the vehicle provided with the four motor units 11 to 14. It should be noted that for a vehicle provided with motors other than four, the number of control sections in the vehicle speed control unit 100 may be appropriately increased or decreased in accordance with the number of motor units.

Figure 1:
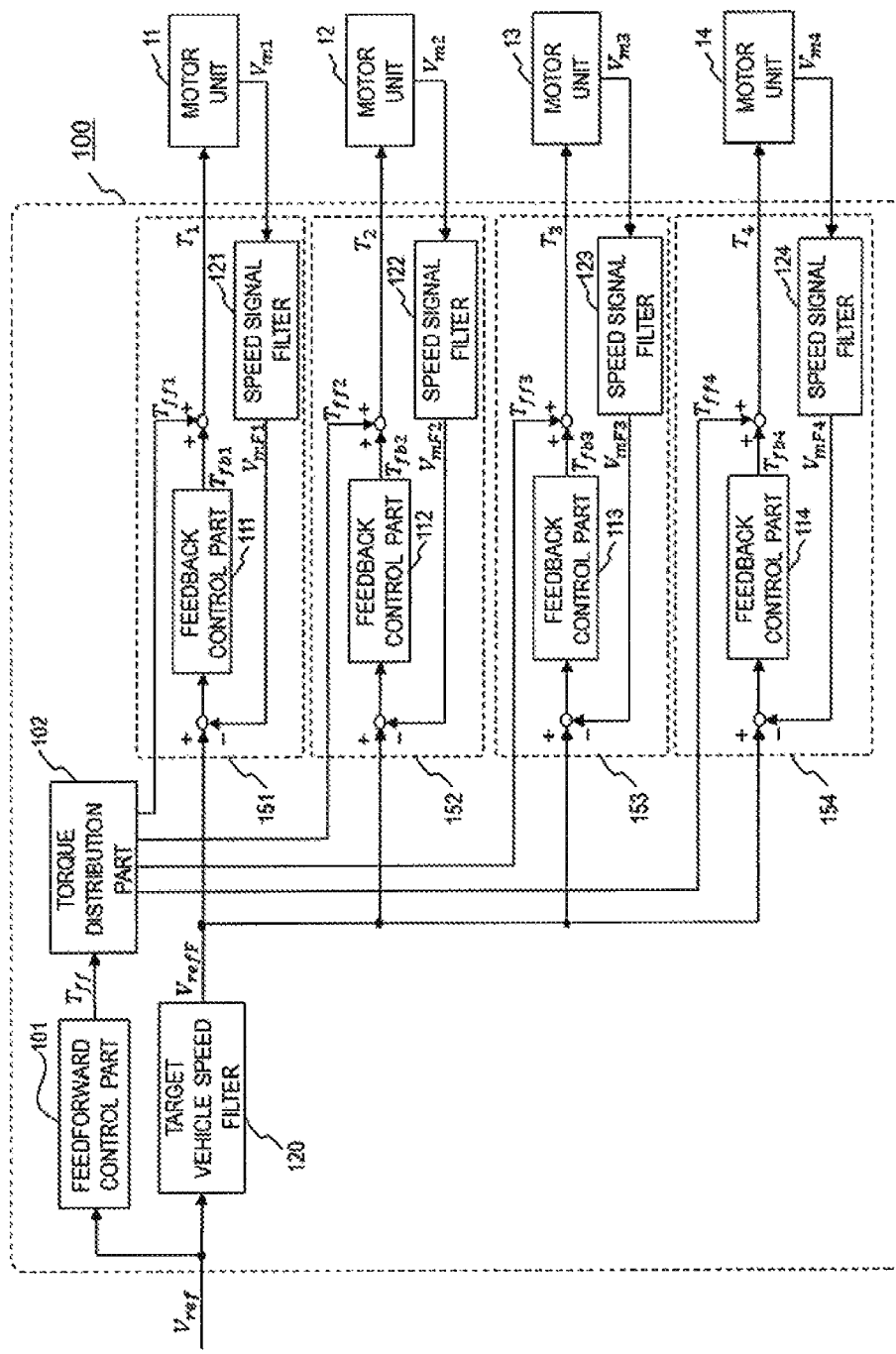
FIG. 1 is a block diagram showing the configuration of a vehicle speed control unit according to Embodiment 1 of the present invention.

FIG. 1 is a block diagram showing a configuration of the vehicle speed control unit 100 according to Embodiment 1 of the present invention. The vehicle speed control unit 100 includes a feedforward control part 101 ("feedforward" may also be abbreviated as "FF" hereinafter), a target vehicle-speed filter 120, a torque distribution part 102, and motor control sections 151 to 154. The motor control sections 151 to 154 have feedback control parts 111 to 114 ("feedback" may also be abbreviated as "FB" hereinafter) and speed signal filters 121 to 124, respectively. The vehicle speed control unit 100 outputs command torques $T_1$, $T_2$, $T_3$, $T_4$ to the respective motor units 11 to 14. The command torques $T_1$, $T_2$, $T_3$, $T_4$ are respective summations of FB command torques $T_{fb1}$, $T_{fb2}$, $T_{fb3}$, $T_{fb4}$ from the FB control parts 111 to 114 and individual FF command torques $T_{ff1}$, $T_{ff2}$, $T_{ff3}$, $T_{ff4}$ that are calculated by dividing the FF command torque from the FF control part 101 by the torque distribution part 102: $T_1=T_{fb1}+T_{ff1}$, $T_2=T_{fb2}+T_{ff2}$, $T_3=T_{fb3}+T_{ff3}$, and $T_4=T_{fb4}+T_{ff4}$.

Figure 2:
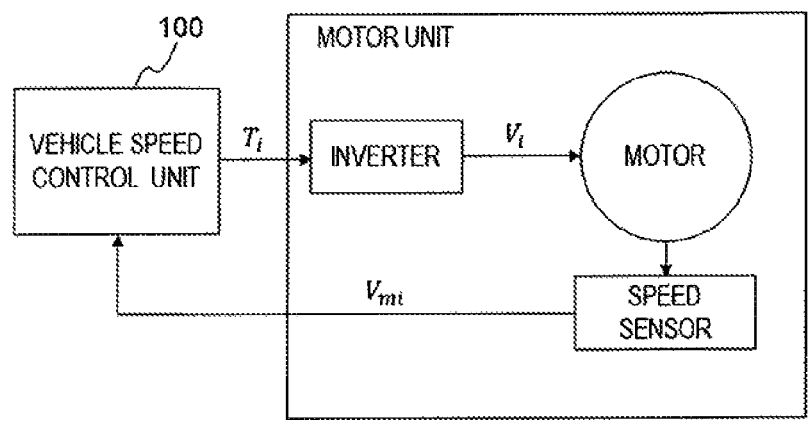
FIG. 2 is a block diagram showing a configuration of the motor unit to which the vehicle speed control unit of the present invention is applied.

The configuration of each motor unit is described here with reference to FIG. 2. The motor units 11 to 14 each have a motor, an inverter for applying voltage to the motor, and a speed sensor for detecting the revolution speed of the motor. The command torques $T_i$ (i=1, 2, 3, 4) are input to the inverters and converted into command voltages $V_i$ (i=1, 2, 3, 4) to be applied to the motors. The speed sensors detect the revolution speeds of the respective motors, to output the motor revolution speed signals $V_{mi}$ (i=1, 2, 3, 4) to the respective motor control sections 151 to 154 in the vehicle speed control unit 100.

A target vehicle-speed signal $V_{ref}$, which indicates a target speed of the vehicle, is input from a higher level control system or by operation of a driver. The FB control parts 111 to 114 calculate the FB command torques $T_{fb1}$, $T_{fb2}$, $T_{fb3}$, $T_{fb4}$ to be input to the respective motor units 11 to 14, on the basis of the differences between a feedback target vehicle-speed signal $V_{refF}$ obtained by passing the target vehicle-speed signal $V_{ref}$ through the target vehicle-speed filter 120 and respective speed signals $V_{mF1}$, $V_{mF2}$, $V_{mF3}$, $V_{mF4}$ obtained by passing through the speed signal filters 121 to 124 the motor revolution speed signals $V_{m1}$, $V_{m2}$, $V_{m3}$, $V_{m4}$ from the speed sensors in the motor units. The calculation may be performed using a proportional-integral (PI) control. While the target vehicle-speed signal $V_{ref}$ may possibly varies in a step manner depending on settings altered such as by a switch operation of the driver, the target vehicle-speed filter 120 reshapes the signal to bring about a smooth change of the vehicle speed. The speed signal filters 121 to 124 have the effect of removing noise in the respective motor revolution speed signals. If the noise is low in itself, the speed signal filters may be omitted.

The FF control part 101 calculates a FF command torque $T_{ff}$ on the basis of the target vehicle-speed signal $V_{ref}$. In the calculation, a product of the transfer function of the target vehicle-speed filter 120 multiplied by the inverse model of a transfer function of the vehicle 1 may be used. The transfer function of the vehicle 1 for use in the calculation may be derived by assuming that the vehicle 1 is a mass point and by taking as an input the summation of forces in the direction of translational motion of the vehicle and as an output the velocity of the mass point. The forces in the translational motion direction can be obtained by conversion of the command torques for motor units 111 to 114 by taking into account the gear reduction ratios in the respective drivetrains, the wheel radius, and the like. In addition, the transfer function may be derived by taking into account the effects of the rolling and the air resistances on the mass point. Under an ideal condition without any disturbances nor modeling error, the vehicle 1 can follow the filtered feedback target vehicle-speed signal $V_{refF}$ by inputting the FF command torque.

The torque distribution part 102 receives the FF command torque $T_{ff}$ and then outputs the individual FF command torques $T_{ff1}$, $T_{ff2}$, $T_{ff3}$, $T_{ff4}$ for the respective motors. At this time, the respective individual FF command torques are calculated so as to satisfy $T_{ff1}+T_{ff2}+T_{ff3}+T_{ff4}=T_{ff}$. Conforming the signs of $T_{ff1}$, $T_{ff2}$, $T_{ff3}$, $T_{ff4}$ to that of $T_{ff}$ allows for narrowing the range of the torque division calculation.

With such the configuration, the vehicle speed control unit 100, while adopting the FF command torques as a base of the follow-up toward the target vehicle speed, corrects deviations from the target speeds of the respective wheels due to a disturbance and a modeling error by the FB control parts 111 to 114. Since the FB control parts 111 to 114 can be designed so as to increase the follow-up performance by taking into account the characteristics of the respective drivetrains to the wheels, e.g., the resonant characteristics of the drivetrain, the vehicle speed control unit 100 of the present invention can implement a vehicle speed control that allows for obtaining a favorable follow-up performance suitable for the vehicle 1 driven by multiple motors.

In speed controls, in order to improve the follow-up performance, a configuration of two degree of freedom control in which FF control is added is often employed. FF control systems are generally designed without taking disturbance into account. However, in a case of a vehicle driven by multiple motors, employing two degree of freedom controls individually for each motor causes the FF command torques to act as disturbances on each other, resulting in that a desired follow-up performance cannot be obtained. In contrast to this, the present invention provides a FF control part that is common to all motors. Since the common FF control part is provided for all motors, a favorable follow-up performance can be obtained by distributing, depending on situations, to the respective motors the individual FF command torques divided by the torque distribution part. Furthermore, utilizing the degree of freedom of the torque distribution part allows the vehicle speed to be controlled taking kinematic performance of the vehicle into account.

Figure 7:
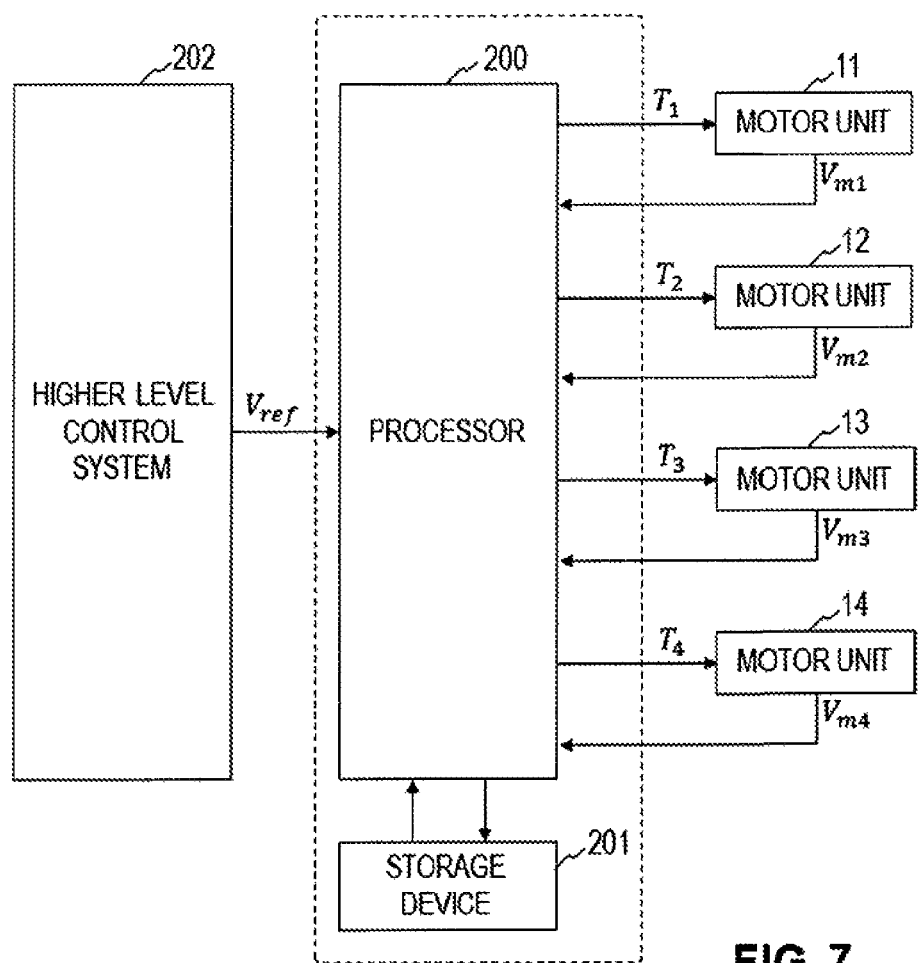
FIG. 7 is a block diagram showing an exemplary hardware configuration of a system including the vehicle speed control unit of the present invention.

FIG. 7 is a block diagram showing an example of the hardware configuration of a system including the vehicle speed control unit 100 according to Embodiment 1. The vehicle speed control unit 100 is implemented by hardware including a processor 200 and a storage device 201. Although not shown, the storage device 201 has a volatile memory such as a random access memory and a not shown non-volatile auxiliary memory such as a flash memory. In addition, the storage device 201 may have an auxiliary storage device (not shown) such as a hard disc instead of the non-volatile auxiliary memory.

The processor 200 executes a program input from the storage device 201. The program corresponds to an algorism for the vehicle speed control unit 100. The program is input to the processor from the auxiliary memory via the volatile memory provided in the storage device 201. In addition, the processor 200 may output data such as a calculation result to the volatile memory in the storage device 201 or may store the data in the auxiliary storage device via the volatile memory.

The processor 200 receives the target vehicle-speed signal $V_{ref}$ from the higher level control system 202. The higher level control system 202 may determine the target vehicle speed $V_{ref}$ on the basis of environmental conditions around the vehicle acquired from a sensor such as a radar, a camera, sonar, a laser, or a GPS and from map information, and on the basis of information of kinematic states of the vehicle such as the vehicle speed, the acceleration, and the yaw rate. The target vehicle speed $V_{ref}$ may be determined on the basis of a driver's operation, such as an accelerator operation, a brake operation, a switch operation, or a transmission operation.

The processor outputs to the respective motor units 11 to 14 the command torques $T_1$, $T_2$, $T_3$, $T_4$ calculated in accordance with the algorism for the vehicle speed control unit 100. Further, the processor acquires the motor revolution speed signals $V_{m1}$, $V_{m2}$, $V_{m3}$, $V_{m4}$ from the speed sensors in the respective motor units.

The functions of the feedforward (FF) control part 101, the target vehicle speed filter 120, the torque distribution part 102, and the motor control sections 151 to 154, which are shown in FIG. 1, are implemented by the processor 200 executing the program stored in the storage device 201 or by a not-shown processing circuit such as a system LSI. A plurality of processors 200 and a plurality of storage devices 201 may cooperatively implement the functions. In addition, the functions may be implemented not only by cooperation of the plurality of processors 200 and the plurality of storage devices 201 but also by cooperation of a plurality of processing circuits. Further in addition, the functions may be cooperatively implemented by a combination of a plurality of processors 200 and a plurality of storage devices 201, and a plurality of processing circuits.

Note that functions of each vehicle speed control unit 100 to be described in the following embodiments other than Embodiment 1 is also implemented as with Embodiment 1 by the processor 200 executing the program stored in the storage device 201 shown in hardware configuration of FIG. 7 or by a not shown processing circuit such as a system LSI.

Embodiment 2

As described in Embodiment 1, the FB control parts 111 to 114 have a feature in that they can be respectively designed so as to increase the follow-up performance by taking into account the drivetrains to the wheels. The front wheels and the rear wheels are different in their mechanical characteristics. Accordingly, the control characteristics of the FB control parts for the motors driving the front wheels and the FB control parts for the motors driving the rear wheels can be deigned differently from each other by taking the respective characteristics of the drivetrains to the wheels into account. For example, since the respective drivetrains to the wheels have different resonant characteristics, setting differently the frequency characteristics of the respective FB control parts by taking their resonant frequencies into account allows the control to be performed suitably for the respective drivetrains to the wheels as well as the follow-up performance to be improved.

Figure 8:
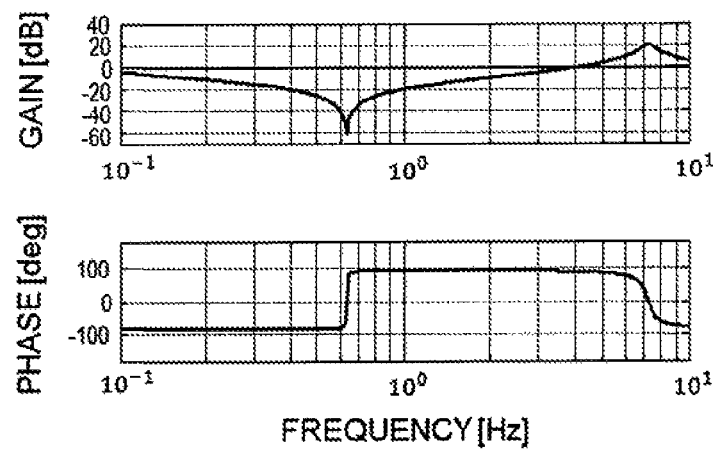
FIG. 8 is a first Bode plot for explaining the configuration of a vehicle speed control unit according to Embodiment 2 of the present invention.
Figure 9:
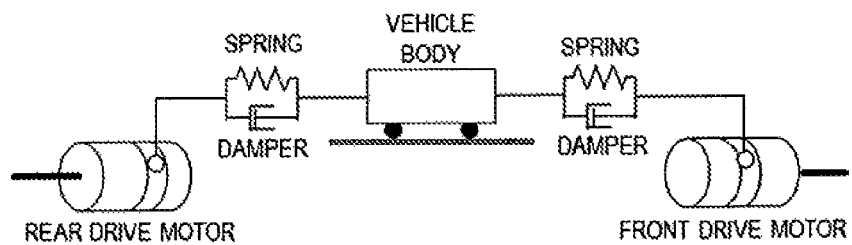
FIG. 9 is a diagram showing a dynamic model of the vehicle, for explaining the operation of the vehicle speed control unit according to Embodiment 2 of the present invention.

FIG. 8 shows an exemplary Bode plot obtained by measuring the revolution speed of the motor when a sinusoidal command torque is input to the motor with its frequency being varied gradually. The Bode plot shown in FIG. 8 corresponds to the resonant characteristic of the motor unit in the present invention, in which the input is the command torque and the output is the revolution speed of the motor. The resonant characteristic shown in the exemplary Bode plot has one resonant point and one anti-resonant point. It is known that such a result is often obtained as the characteristic of the motor unit provided in a vehicle and connected to the drivetrain, and the vehicle can be dynamically modeled as a two-inertia system in which the inertia of a motor axis and the inertia of the vehicle body are connected via springs and dampers. A dynamic model of a vehicle provided with two motors respectively driving the front wheels and the rear wheels can be illustrated as an example in FIG. 9. The FB control parts may be respectively adjusted for the motors by taking such a resonant characteristic into account.

Figure 10:
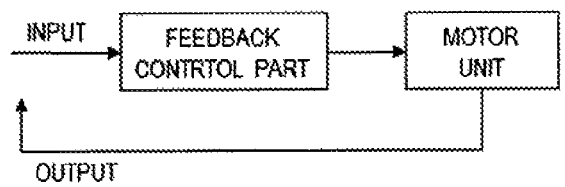
FIG. 10 is a block diagram showing the open loop of a FB control part, for explaining the configuration of the vehicle speed control unit according to Embodiment 2 of the present invention.
Figure 11:
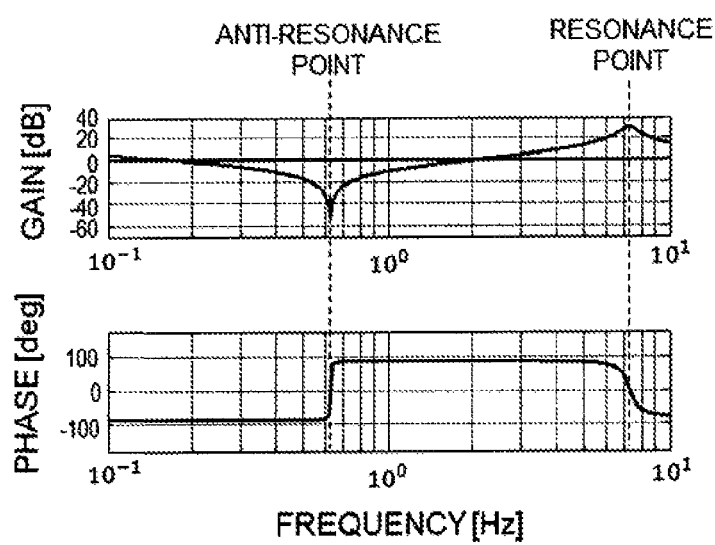
FIG. 11 is a second Bode plot for explaining the configuration of the vehicle speed control unit according to Embodiment 2 of the present invention.
Figure 12:
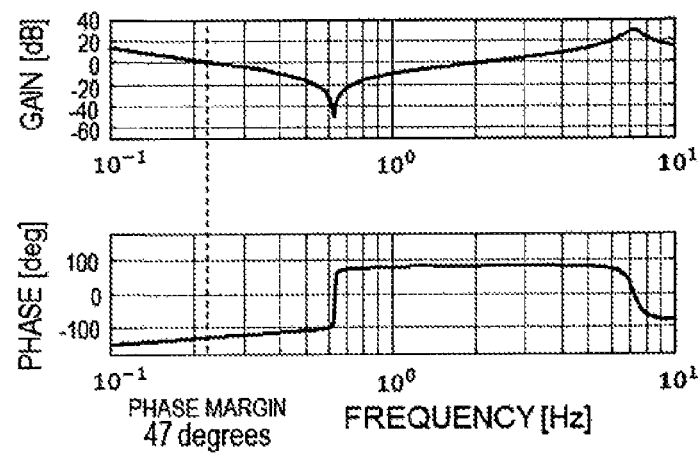
FIG. 12 is a third Bode plot for explaining the configuration of the vehicle speed control unit according to Embodiment 2 of the present invention.

Next, an empirical method of adjusting the proportional and the integral gains is described as an exemplary method of adjusting the FB control parts by taking into account the resonant characteristics of the drivetrains. Now, a consideration is made of an open loop system in which the FB control part and the motor unit are connected in series as shown in FIG. 10. In the consideration, a torque filter and the speed signal filter are excluded for the sake of simplicity. First, the proportional gain alone is varied with the integral gain being set zero, to analyze the Bode plot of the transfer function between the input to the FB control part and the output to the motor unit. The gain plot in the Bode plot of FIG. 8 is shifted upwardly with increasing proportional gain and shifted downwardly with decreasing proportional gain. A proportional gain that causes the gain plot to intersect the 0 dB line in the middle between the anti-resonant point and the resonant point as shown in FIG. 11 is employed as an appropriate value. Next, the integral gain is adjusted with the proportional gain being fixed. Although a larger integral gain is desirable from the view point of suppressing disturbance, stability of the FB control part is degraded because the phase lag increases with increasing integral gain. It is preferable as a guideline to increase the integral gain as large as possible in a range where the phase margin is over 40 degrees, as shown in FIG. 12.

Figure 13:
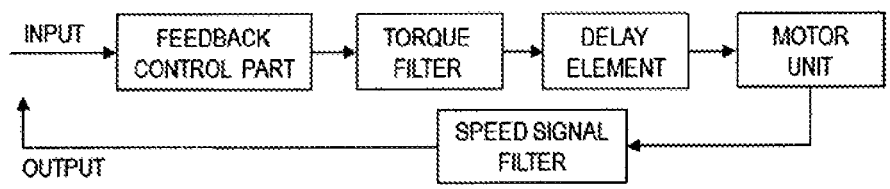
FIG. 13 is a second block diagram showing the open loop of the FB control part, for explaining the configuration of the vehicle speed control unit according to Embodiment 2 of the present invention.

It is noted that although a FB control is implemented using the proportional and the integral gains determined in the above procedure, no sufficient stability may in some cases be achieved owing to influence of the control cycle in an actual vehicle and other influences. In that case, by analyzing the stability margin of an open loop system shown in FIG. 13 additionally including a delay element for simulating the control cycle, a torque filter and a speed signal filter, the proportional and the integral gains, and the cutoff frequency of the filter are preferably adjusted so that the gain margin becomes 10 dB to 20 dB and the phase margin becomes 40 degrees to 60 degrees as a guideline.

The proportional and integral gains determined by the above procedure are different depending on the Bode plot representing the resonant characteristic of the drivetrain. Specifically, for example, the FB control part for controlling the motor driving the front wheels and the FB control part for controlling the motor driving the rear wheels are different in their proportional and integral gains.

In addition, various control theories such as an optimal control or a robust control, not limited to the proportional-integral control, may be applied as another method of designing the FB control part to the FB command torque calculation based on a dynamic model expressed by a transfer function or a state equation. In the application, a favorable follow-up performance can be also achieved for the vehicle as a whole by adjusting the motor control sections depending on the dynamic models of the respective drivetrains.

As described above, the present invention has a feature in that the control characteristic, in particular, the frequency characteristic of at least either one of the gain and the phase, of at least one of the feedback control parts is different from the control characteristics of the other feedback control parts.

Embodiment 3

Figure 14:
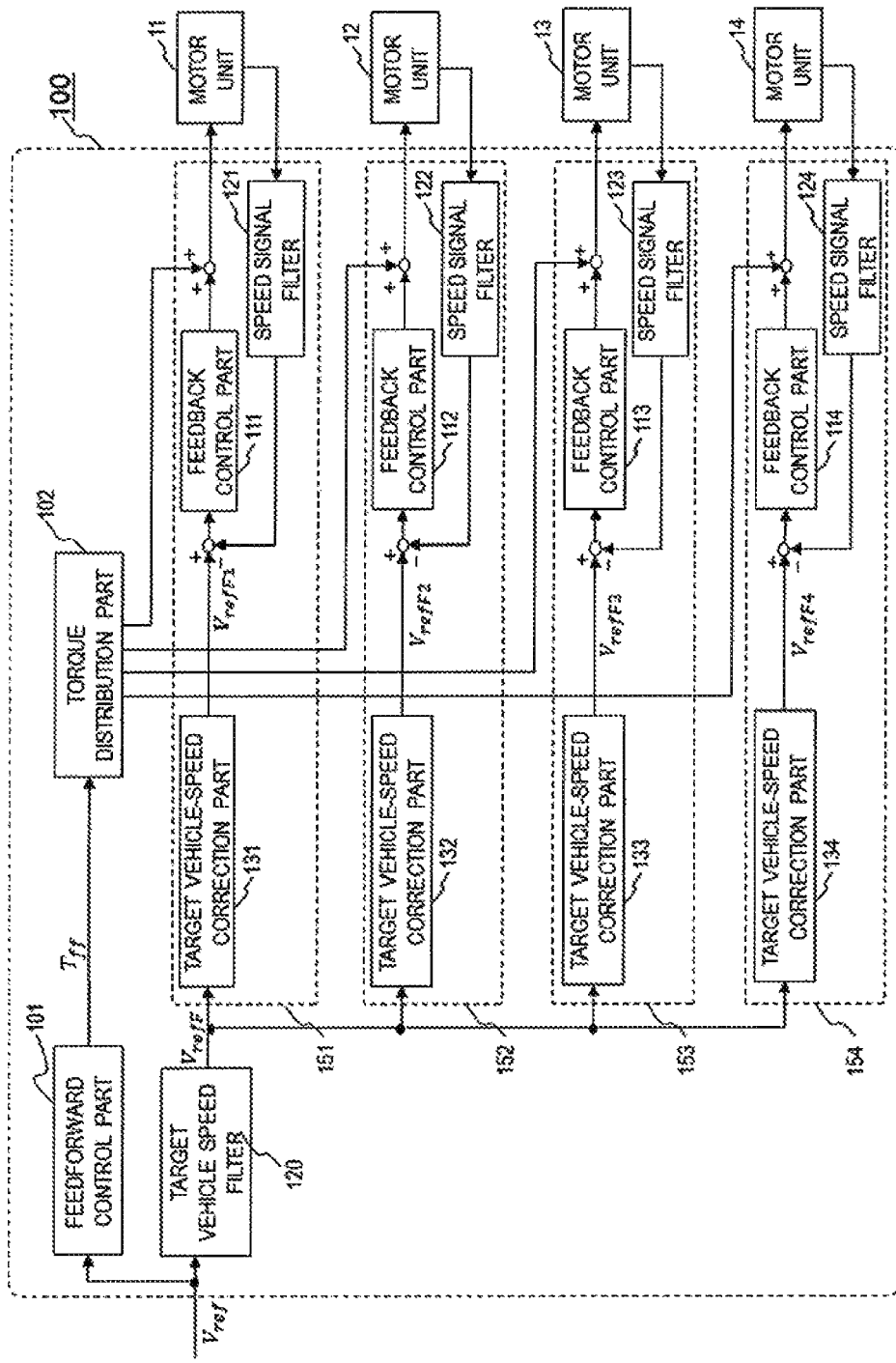
FIG. 14 is a block diagram showing the configuration of a vehicle speed control unit according to Embodiment 3 of the present invention.

FIG. 14 is a block diagram showing the configuration of a vehicle speed control unit according to Embodiment 3 of the present invention. In the configuration of FIG. 1, the common feedback target vehicle-speed signal $V_{refF}$ after filtered is input to the respective FB control parts 111 to 114 for the motors. However, revolution speed differences between the inner wheels and the outer wheels are physically developed during turning of the vehicle 1. Differentiating target vehicle speeds to be input to the respective FB control parts 111 to 114 by taking the revolution speed differences into account allows for improving the follow-up accuracy and the turning performance. The vehicle speed control unit 100 according to Embodiment 3 shown in FIG. 14 is configured to input, to the respective FB control parts 111 to 114, individual feedback target vehicle-speed signals that are obtained by passing the filtered feedback target vehicle-speed signal $V_{refF}$ through target vehicle-speed correction parts 131 to 134. The individual feedback target vehicle-speed signals corrected by passing through the target vehicle-speed correction parts 131 to 134 are designated at $V_{refF1}$, $V_{refF2}$, $V_{refF3}$, $V_{refF4}$ corresponding to the respective motor units.

There is a method of correcting the target vehicle speed by taking into account the revolution speed differences between the inner wheels and the outer wheels during turning. For example, a vehicle speed correction method takes into account the speed of the vehicle 1, and the geometric positional relations of the contact points with the ground of, steering angles of, and the sideslip angles of the respective wheels 21 to 24. The method is specifically described below with reference to FIG. 15.

Figure 15:
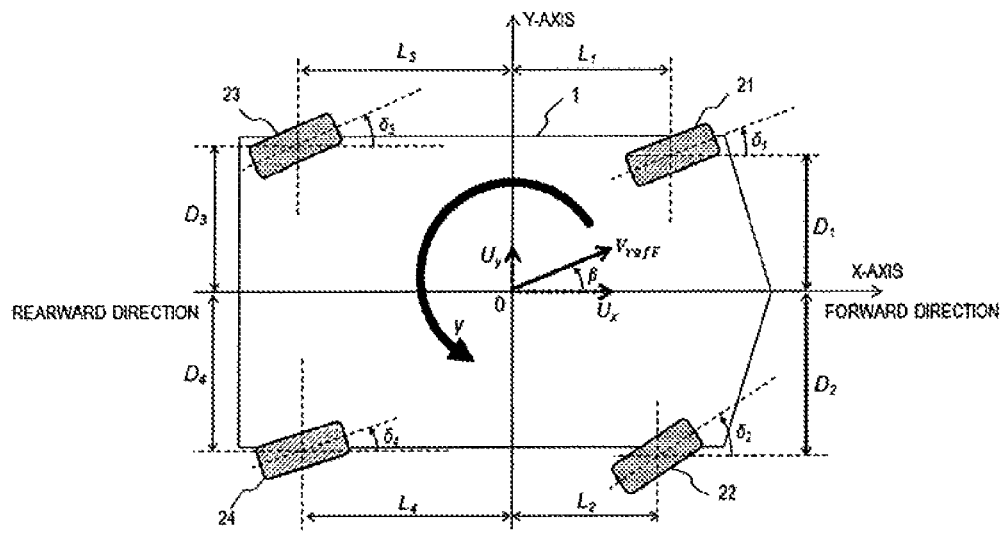
FIG. 15 is a diagram for explaining the operation of target vehicle-speed correction parts in the vehicle speed control unit according to Embodiment 3 of the present invention.

FIG. 15 is a diagram of the vehicle viewed from above. An x-axis is set to be the line of bilateral symmetry bisecting the vehicle 1 in the front-back direction, and an origin point O is set at an arbitrary point on the x-axis. For example, the origin point O may be set at the center of gravity or at the point of the intersection of the x-axis and the line connecting the centers of the right and left rear wheels. The positive direction of the x-axis is defined to be the forward direction of the vehicle 1. Further, a y-axis is set so as to intersect the origin point O and to be perpendicular to the x-axis. The positive direction of the y-axis is defined to be the left direction with respect to the forward direction of the vehicle 1. These coordinate axes are fixed to the vehicle 1.

It is assumed here that the velocity of the origin O is controlled to the speed indicated by the target vehicle-speed signal $V_{refF}$. The x-axis component $U_x$ and y-axis component $U_y$ of the velocity $V_{refF}$ are expressed as follows:

$$U_x = V_{refF} \cos \beta \quad (1), \text{ and}$$

$$U_y = V_{refF} \sin \beta \quad (2).$$

The angle $\beta$ is the sideslip angle of the vehicle 1 at the origin point O. A sideslip angle of the vehicle 1 during movement may be used as the angle $\beta$. A value acquired by a sensor or an estimated value may also be used as the sideslip angle. In addition, an appropriate value based on a target vehicle velocity, a steering angle, a road condition, and the like may be set as the angle $\beta$ by the target vehicle-speed correction parts 131 to 134. In particular, when the vehicle 1 travels with a large sideslip angle and the tire-generatable side force is saturated, setting a small angle $\beta$ determined by the target vehicle-speed correction parts 131 to 134 is effective for stabilizing the vehicle 1.

Here, the distances from the y-axis to the centers of the left and right front wheels and to the centers of the left and right rear wheels are designated at $L_1$, $L_2$, $L_3$, $L_4$, respectively. The distances from the x-axis to the centers of the left and right front wheels and to the centers of the left and right rear wheels are designated at $D_1$, $D_2$, $D_3$, $D_4$, respectively. The steering angles of the left and right front wheels and the left and right rear wheels are designated at $\delta_1$, $\delta_2$, $\delta_3$, $\delta_4$, respectively. Further, the yaw rate is designated at $\gamma$, and the sideslip angles of the left and right front wheels and the left and right rear wheels are designated at $\beta_1$, $\beta_2$, $\beta_3$, $\beta_4$, respectively. With the above designation, the target vehicle-speed correction parts 131 to 134 respectively calculate $V_{refF1}$, $V_{refF2}$, $V_{refF3}$, $V_{refF4}$ using the following expressions.

$$V_{refF1} = \sqrt{(U_x - D_1\gamma)^2 + (U_y + L_1\gamma)^2} \cos \beta_1 \quad (3),$$

$$V_{refF2} = \sqrt{(U_x + D_2\gamma)^2 + (U_y + L_2\gamma)^2} \cos \beta_2 \quad (4),$$

$$V_{refF3} = \sqrt{(U_x - D_3\gamma)^2 + (U_y - L_3\gamma)^2} \cos \beta_3 \quad (5), \text{ and}$$

$$V_{refF4} = \sqrt{(U_x + D_4\gamma)^2 + (U_y - L_4\gamma)^2} \cos \beta_4 \quad (6).$$

Figure 16:
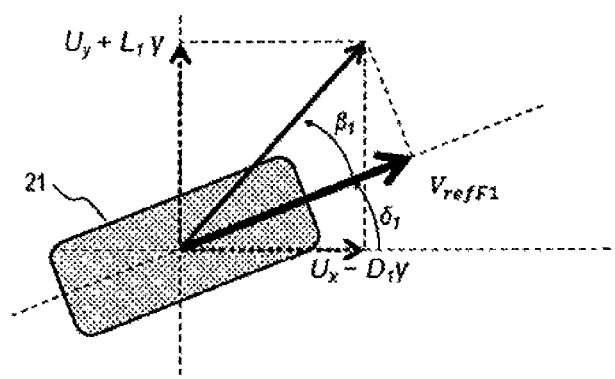
FIG. 16 is an enlarged diagram showing a part of FIG. 9, for explaining the target vehicle-speed correction parts in the vehicle speed control unit according to Embodiment 3 of the present invention.

These expressions are determined on the basis the geometric relation. An enlarged diagram focused on the left front wheel 21 is shown in FIG. 16. Values acquired during movement by a sensor or estimated values may be used as the sideslip angles of the respective wheels 21 to 24. Otherwise, the sideslip angles may be calculated on the basis of geometric relation of the vehicle using the following expressions.

$$\beta_1 = \tan^{-1}\left(\frac{U_y + L_1\gamma}{U_x - D_1\gamma}\right) - \delta_1, \quad (7)$$

$$\beta_2 = \tan^{-1}\left(\frac{U_y + L_2\gamma}{U_x + D_2\gamma}\right) - \delta_2, \quad (8)$$

$$\beta_3 = \tan^{-1}\left(\frac{U_y - L_3\gamma}{U_x - D_3\gamma}\right) - \delta_3, \text{ and} \quad (9)$$

$$\beta_4 = \tan^{-1}\left(\frac{U_y - L_4\gamma}{U_x + D_4\gamma}\right) - \delta_4. \quad (10)$$

As the yaw rate $\gamma$ of the vehicle, a value acquired by a yaw rate sensor may be used or an appropriate value based on the target vehicle speed, the steering angle, a road condition, and the like may be set by the target vehicle-speed correction parts 131 to 134.

In the case of the vehicle 1 provided with three motors as shown in FIG. 4, one of the motors drives the pair of right and left front wheels via the differential gear 31, and in the case of the vehicle 1 provided with two motors as shown in FIG. 5, these motors drive the pair of right and left front wheels and the pair of right and left rear wheels via the differential gears 31 and 32, respectively. A target vehicle speed for the motors driving the pair of wheels via the differential gear may be corrected in such a manner that the individual feedback target vehicle-speed signals $V_{refF1}$, $V_{refF2}$, $V_{refF3}$, $V_{refF4}$ are first calculated by assuming that the four wheels are respectively driven by the four motors and then a target vehicle speed for the pair of wheels to be driven is averaged. For example, in the case of FIG. 5, the corrected target vehicle speed for the motor 11 may be set to $(V_{refF1} + V_{refF2})/2$.

Embodiment 4

Figure 17:
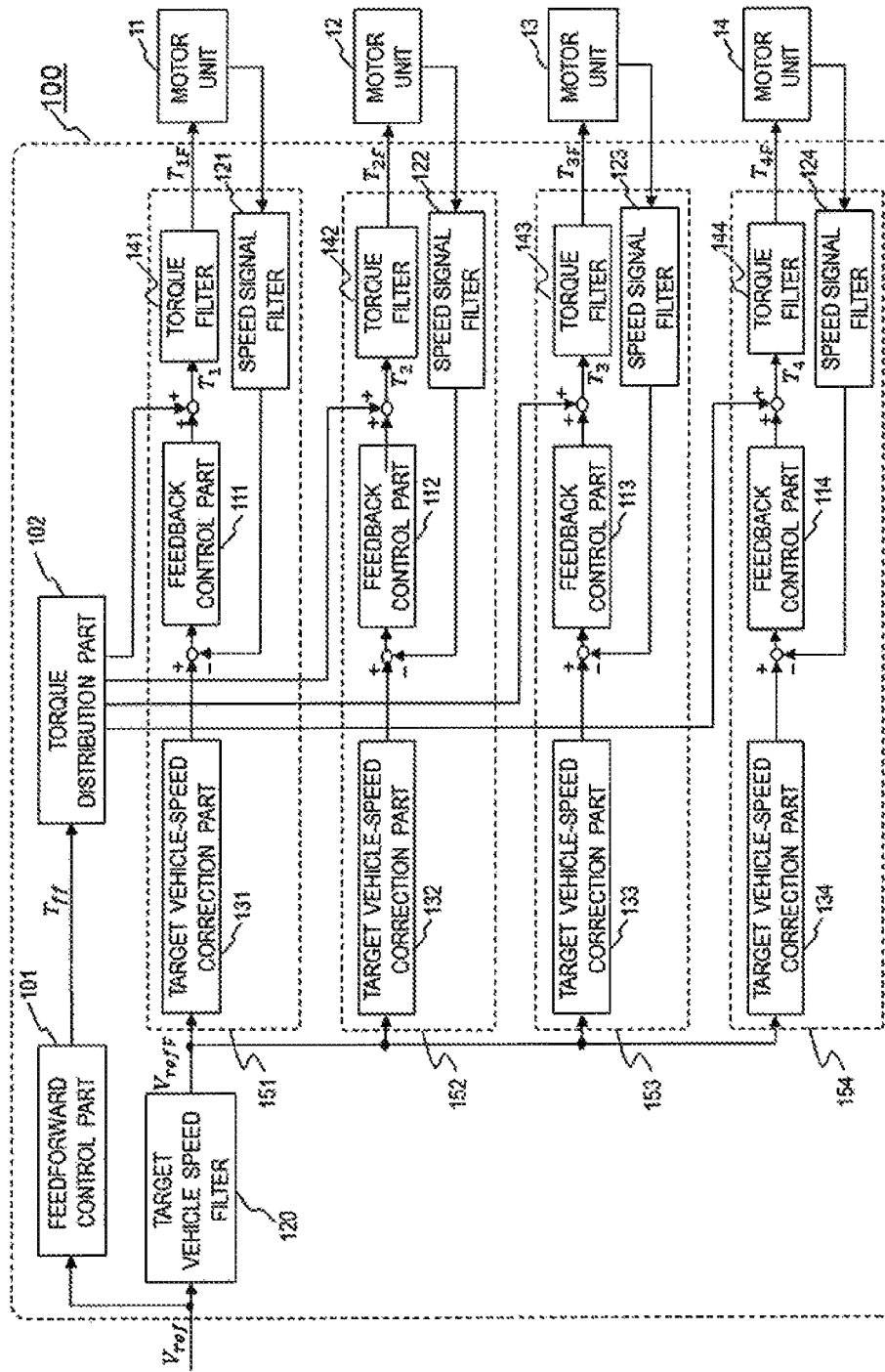
FIG. 17 is a block diagram showing the configuration of a vehicle speed control unit according to Embodiment 4 of the present invention.

FIG. 17 is a block diagram showing the configuration of a vehicle speed control unit according to Embodiment 4 of the present invention. While the FB control parts 111 to 114 need to lower the follow-up performance to avoid excitation of the vibration of the vehicle 1, the final command torques to be input to the respective motor units 11 to 14 are the respective summations $T_1$, $T_2$, $T_3$, $T_4$ of the FB command torques and individual FF command torques. Hence, in order to reduce the vehicle body vibration more proactively, it is effective to interpose torque filters 141 to 144 in the respective fore stages of the input ports of the motor units 11 to 14 as shown in FIG. 17 and to use their outputs $T_{1F}$, $T_{2F}$, $T_{3F}$, $T_{4F}$ as final command torques. The cut-off frequencies of the filters may be set by taking into account the resonant frequencies of the respective drivetrains corresponding to the motors in the motor units 11 to 14, so as to cut the resonant frequencies. Since the resonant frequency is generally known to be around 10 Hz, setting the cut-off frequencies of the torque filters to about 1 to 10 Hz allows the vibration reduction effect to be obtained more easily. While the interposition the torque filters 141 to 144 moderates the follow-up performance, the filter may be adjusted by taking into account the balance between the performance and ride quality to be improved by reduction of the vehicle body vibration.

Embodiment 5

Figure 18:
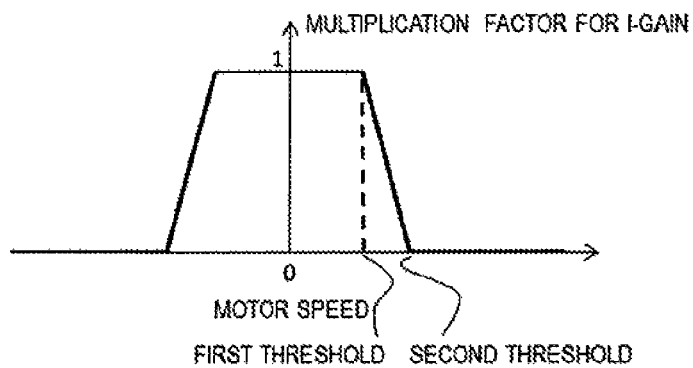
FIG. 18 is a diagram for explaining the operation of a vehicle speed control unit according to Embodiment 5 of the present invention.

A PI-control is often used in a FB speed control system for a motor. In the vehicle 1 driven by the multiple motors, providing the FB control parts 111 to 114 for the respective motors 11 to 14 causes a problem when a mismatch occurs between the respective target vehicle speeds for the motors 11 to 14 and a physical and geometric constraint on the vehicle. To give a concrete example, while revolution speed differences between each of the wheels 21 to 24 are developed physically during turning, inputting as a target vehicle speed a common feedback target vehicle-speed signal $V_{refF}$ to the motors causes speed deviations inevitably to remain continuously, resulting in continuous increase or decrease of the FB command torques owing to the effect of the I-control. If the continuous increase or decrease in the torques becomes excessive, the wheels 21 to 24 may possibly slip. Although introducing the target vehicle-speed correction units 131 to 134 described in Embodiment 3 allows for reducing the speed deviations and for mitigating the rate of the command torque accumulation due to the I-control, it is desirable to reduce the adverse effect due to the accumulation. In particular, the more increase in the vehicle speed and/or the steering angle, the larger the speed deviations becomes during turning. In order to resolve the accumulation, a means may be employed in which the larger the motor speed or the steering angle becomes, the more the gain of the I-control is decreased on the basis of the motor speed or the steering angle or the both. An exemplary map of speed of the motor versus multiplication factors for the I-gain is shown in FIG. 18. As shown in FIG. 18, the factors to be multiplied to the I-gain are set one in the motor speed range lower than a first threshold and decreased in the range between the first threshold and a second threshold, and set zero in the range higher than the second threshold. Varying the I-gain in this way allows disturbance and the like to be prevented by utilizing the I-control in a lower speed range as well as a possible demerit due to the I-control in a higher speed range to be reduced.

In addition, the upper limit of the absolute value of the command torque by the I-control may be decreased on the basis of information of the motor speed and/or the steering angle instead of decreasing the I-gain, or on the basis of a combination of the gain decrease and the information. Further, the wheel revolution speeds or the vehicle speed may be used instead of the motor speeds.

Embodiment 6

A description will be made of a method of improving the kinematic performance of the vehicle 1 by utilizing the degree of freedom of the torque distribution part 102 of the present invention. The vehicle 1 receives a larger ground contact load acting on the rear wheels than on the front wheels during acceleration, and a larger ground contact load acting on the front wheels than on the rear wheels during deceleration. The tire-road friction force increases with increasing ground contact load. Hence, distributing the command torques mainly to the rear wheels during acceleration of the vehicle 1 and to the front wheels during deceleration thereof allows the dynamically obtainable tire-road friction force to be efficiently utilized for the vehicle as a whole. This extends the achievable acceleration/deceleration range during braking and accelerating. In addition, the tire-road friction force has components in the traveling direction and the lateral direction. The efficient utilization of the tire-road friction force leads to ensuring allowance for generation of the lateral force and is effective for keeping stability of the vehicle.

Figure 19:
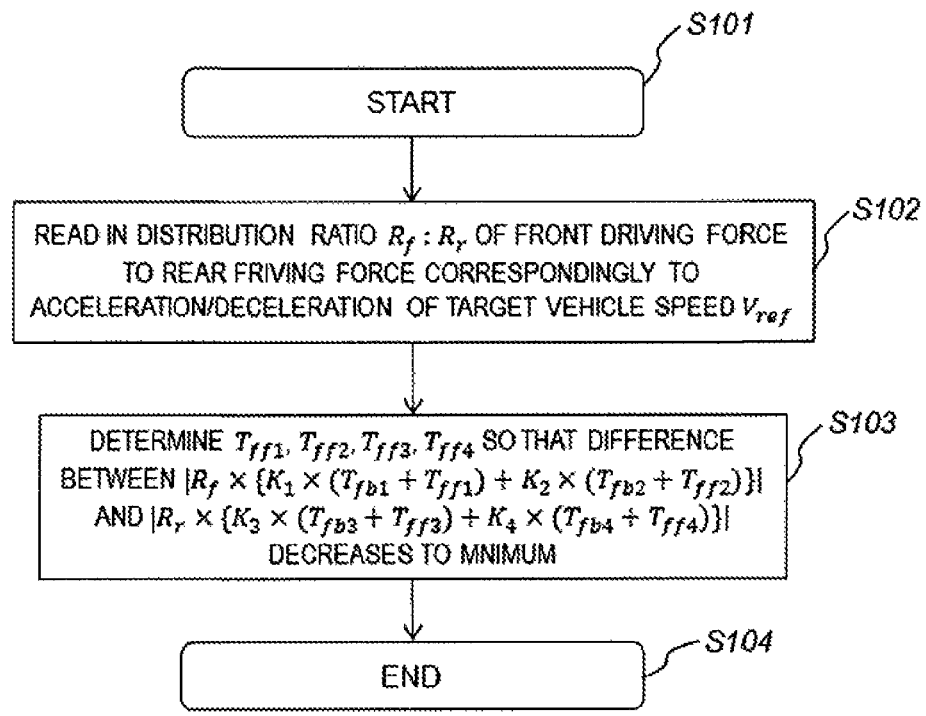
FIG. 19 is a flow diagram showing the operation of a vehicle speed control unit according to Embodiment 6 of the present invention.

The torque distribution part 102 of the vehicle speed control unit 100 according to Embodiment 6 of the present invention distributes the command torques for the front and rear wheels using, for example, the following method. The method is described with reference to the flow diagram shown in FIG. 19. On start of the operation flow (Step S101), the torque distribution part 102 reads in a distribution ratio $R_f:R_r$ of a front driving force to a rear driving force in the translational direction, which ratio is determined in advance correspondingly to the acceleration/deceleration of the vehicle speed indicated by the filtered feedback target vehicle-speed signal $V_{refF}$ (Step S102). Then, $T_{ff1}$, $T_{ff2}$, $T_{ff3}$, $T_{ff4}$ are determined so that a ratio of the total front-wheel driving force $\{K_1 \times (T_{fb1}+T_{ff1})+K_2 \times (T_{fb2}+T_{ff2})\}$ and the total rear-wheel driving force $\{K_3 \times (T_{fb3}+T_{ff3})+K_4 \times (T_{fb4}+T_{ff4})\}$ approximate to the ratio (Step S103), and then the flow finishes (Step S104). For example, the following evaluation index $J_2$ may be used as a specific method for Step S103.

$$J_2 = |R_r\{K_1(T_{fb1}+T_{ff1})+K_2(T_{fb2}+T_{ff2})\} - R_f\{K_3(T_{fb3}+T_{ff3})+K_4(T_{fb4}+T_{ff4})\}| \quad (11).$$

In the method, it is sufficient to find $T_{ff1}$, $T_{ff2}$, $T_{ff3}$, $T_{ff4}$ that minimize $J_2$. Various optimization techniques, or a random or a brute-force substitution may be used for the finding calculation. Further, in the finding calculation, constraint conditions of $K_1 \times (T_{fb1}+T_{ff1}) = K_2 \times (T_{fb2}+T_{ff2})$ and $K_3 \times (T_{fb3}+T_{ff3}) = K_4 \times (T_{fb4}+T_{ff4})$ may be added to reduce the calculation load as well as yaw moment generation due to torque difference between the right and left wheels.

While this example is targeted at the vehicle provided with the four motors, the same idea can be applied to a vehicle provided with a different number of motors.

Embodiment 7

The FF control part 101 in the vehicle speed control unit 100 of the present invention plays a major role for improving the follow-up performance. When another vehicle, an obstacle, or the like exists near in front and/or behind of the vehicle 1, priority needs to be given to avoidance of collision. In such a situation, the FF control may excessively effect the follow-up performance. Embodiment 7 describes below a method of resolving the problem.

Figure 20:
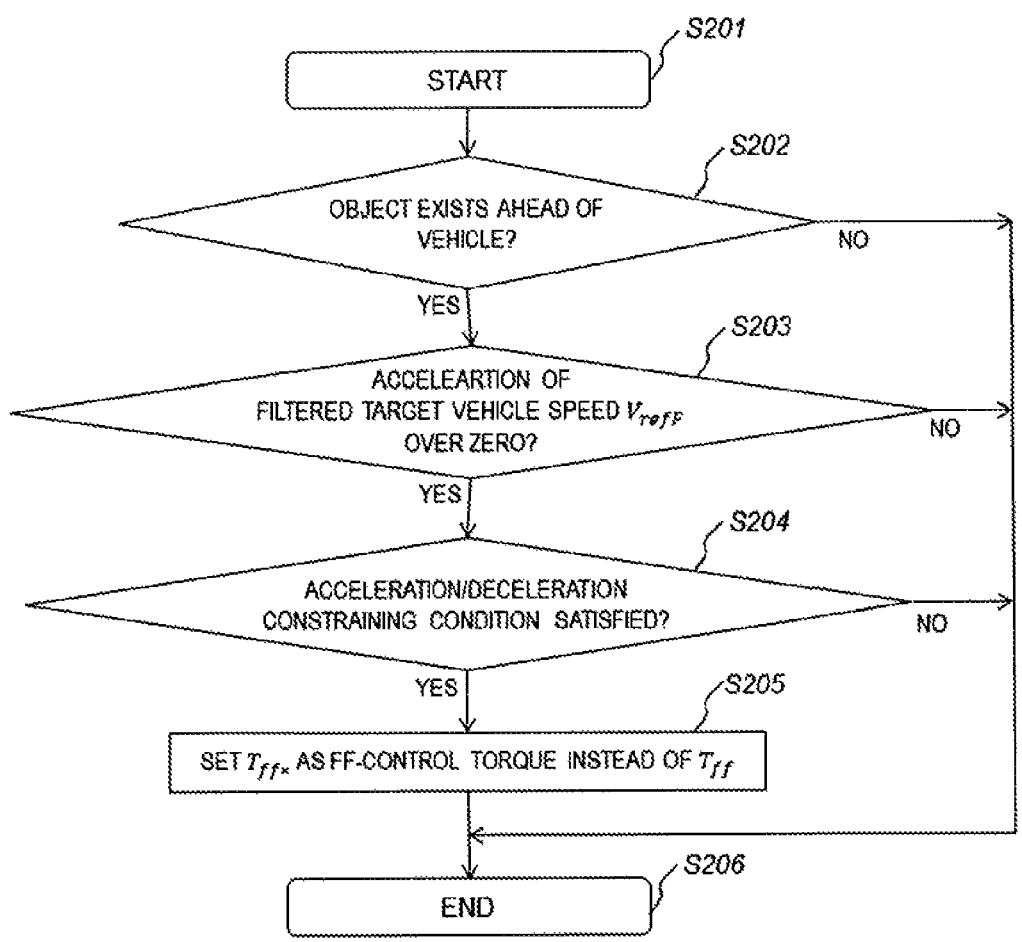
FIG. 20 is a flow diagram showing the operation of a vehicle speed control unit according to Embodiment 7 of the present invention.

An operation flow for a situation when the vehicle 1 moves or is going to move forward is shown as an example in FIG. 20. On start of the flow (Step S201), determination is made first of presence or absence of an object ahead of the vehicle (Step S202). If there is no object, the flow jumps to the "END" (Step S206). If there is the object, a check is made for the sign of the acceleration of the filtered feedback target vehicle-speed signal $V_{refF}$ (Step S203). If the acceleration of $V_{refF}$ is zero or larger, the next Step S204 is executed, and otherwise the flow jumps to the "END".

At executing Step S204, the object exists ahead of the vehicle 1 and the vehicle is in a situation commanded to accelerate forward. Step 204 checks whether an acceleration/deceleration constraining condition is satisfied. The acceleration/deceleration constraining condition is for determining the necessity of limiting the absolute value of the FF command torque $T_{ff}$ on the basis of the relative distance and the relative speed to the forward object. For example, if only the relative distance is taken into account, (current relative distance $D_c \leq$ relative distance limit $D_{cm}$) may be employed as the acceleration/deceleration constraining condition. If both the relative distance and the relative speed are taken into account, (current inter-vehicle time $T_c \leq$ inter-vehicle time limit $T_{cm}$) may be employed as the acceleration/deceleration constraining condition. The inter-vehicle time refers to a time interval between from passage of an object ahead of the vehicle 1 through a point to passage of the vehicle through the point. If the acceleration/deceleration constraining condition is not satisfied, the flow jumps to the "END".

Figure 21:
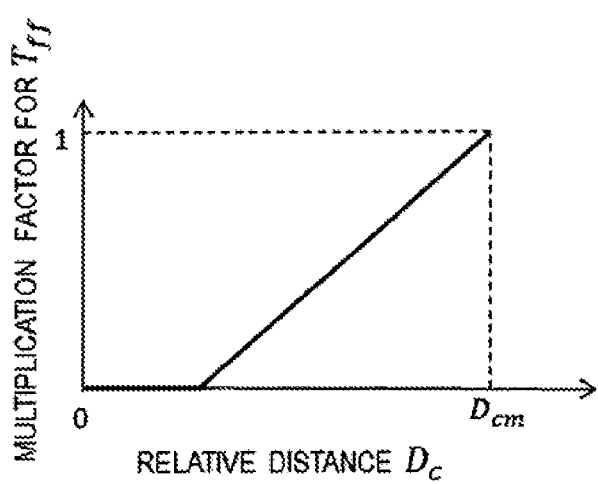
FIG. 21 is a diagram showing the operation of the vehicle speed control unit according to Embodiment 7 of the present invention.

If the acceleration/deceleration constraining condition is satisfied, a FF controlled torque $T_{ff}^*$ that is used instead of $T_{ff}$ is calculated (Step S205), and then the flow finishes. The FF controlled torque $T_{ff}^*$ may be calculated, for example, by multiplying $T_{ff}$ by a relevant one of positive real numbers that are beforehand mapped correspondingly to the relative distances as shown in FIG. 21. The map may be created on the basis of the inter-vehicle time.

In a case of using $T_{ff}^*$, the torque distribution part 102 divides the FF command torque $T_{ff}^*$ into individual FF command torques $T_{ff1}$, $T_{ff2}$, $T_{ff3}$, $T_{ff4}$ so as to satisfy $T_{ff1}+T_{ff2}+T_{ff3}+T_{ff4}=T_{ff}^*$ for distribution to the respective motors 11 to 14, after the flow finishes. At this time, conforming the signs of $T_{ff1}$, $T_{ff2}$, $T_{ff3}$, $T_{ff4}$ to that of $T_{ff}^*$ allows for narrowing the range of calculating the torques to be distributed.

Figure 22:
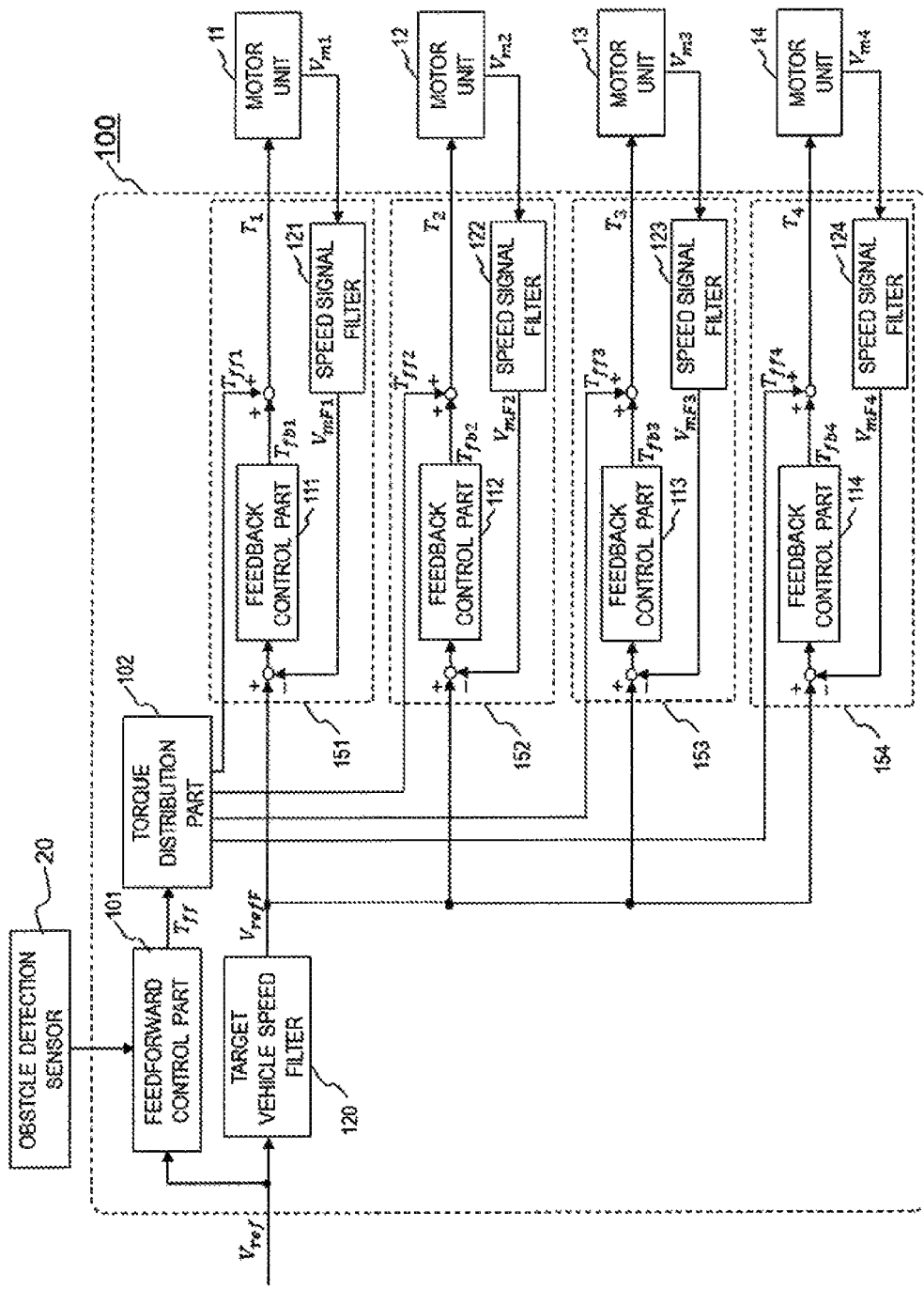
FIG. 22 is a block diagram showing the configuration of a system including the vehicle speed control unit according to Embodiment 7 of the present invention.

It should be noted that a similar concept can be applied to a means for avoiding collision with a backward object when the vehicle 1 moves backward or is going to move backward. The relative distance and the relative speed to a forward or a backward object can be acquired by a sensor such as a millimeter-wave radar, a camera, laser, or sonar. The sensor for acquiring the relative distance and a relative speed to a forward or a backward object is referred here to as an obstacle detection sensor. The configuration diagram of the system in which the obstacle detection sensor 20 is added to the configuration of FIG. 1 is shown in FIG. 22.

It should be noted that each embodiment of the present invention may be appropriately combined, modified or omitted within the spirit and the scope of the invention.

NUMERAL REFERENCES

1: vehicle;
11, 12, 13, 14: motor unit;
20: obstacle detection sensor;
21, 22, 23, 24: wheel;
100: vehicle speed control unit;
101: feedforward control part;
102: torque distribution part;
121, 122, 123, 124: feedback control part;
121, 122, 123, 124: speed signal filter;
131, 132, 133, 134: target vehicle-speed correction part;
141, 142, 143, 144: torque filter;
$V_{ref}$: target vehicle-speed signal; and
$V_{reff}$: feedback target vehicle-speed signal.

The invention claimed is:

1. A vehicle speed controller comprising:
a processor configured to:
control multiple motors driving wheels of a vehicle provided with the multiple motors so that a speed of the vehicle follows a vehicle speed indicated by a target vehicle speed signal being input;
generate feedback command torques for feedback controlling each of the multiple motors, based on a respective deviation between a speed signal from a speed sensor detecting a revolution speed of each of the multiple motors and a feedback target vehicle speed signal obtained by passing the inputted target vehicle speed signal through a target vehicle speed filter, to feedback-control the multiple motors;
calculate a feedforward command torque for feedforward controlling the vehicle using a transfer function whose input is the inputted target vehicle speed signal and whose output is the feedforward command torque for the vehicle; and
divide the feedforward command torque into individual feedforward command torques for distribution to the multiple motors,
wherein the transfer function used in calculating the feedforward command torque is a product of a transfer function of the target vehicle speed filter used in generating the feedback command torques multiplied by an inverse model of a transfer function of the vehicle, the transfer function of the vehicle having as an input a summation of forces in a direction of translational motion of the vehicle and having as an output the vehicle speed, and
wherein the processor respectively adds the individual feedforward command torques to the feedback command torques for the multiple motors, to control the multiple motors.

2. The vehicle speed controller of claim 1, wherein the processor respectively generates feedback command torques for the multiple motors, based on respective deviations between the speed signals and individual feedback target vehicle speed signals for the multiple motors driving the wheels that are corrected from the feedback target vehicle speed signal reshaped from the inputted target vehicle speed signal by the target vehicle speed filter, based on the speed of and a yaw rate of the vehicle, and geometric positional relations of the contact points with the ground of, steering angles of, and sideslip angles of the wheels.

3. The vehicle speed controller of claim 2, wherein in a case the vehicle includes total four wheels of right and left pairs of front and rear wheels and with the multiple motors for respectively driving the right and left pairs of wheels via differential gears, the processor calculates respective target vehicle speeds for the four wheels and then average the target vehicle speeds for the right and left pairs of wheels as corrected feedback target vehicle speeds for the right and left pairs of wheels.

4. The vehicle speed controller of claim 1, wherein the feedback control of the multiple motors respectively includes integral controls, and the processor decreases gains of the integral controls with increase of the revolution speeds of the multiple motors and/or increase of a steering angle of the vehicle.

5. The vehicle speed controller of claim 1, wherein the processor decreases the feedforward command torque, based on a relative speed between the vehicle and an obstacle detected by an obstacle detection sensor detecting a distance to and the obstacle ahead of or behind the vehicle.

6. The vehicle speed controller of claim 5, wherein the processor decreases the feedforward command torque, based on an inter-vehicle time based on a relative distance or a relative speed between the vehicle and the obstacle detected by the obstacle detection sensor.

7. The vehicle speed controller of claim 1, wherein a control characteristic of at least one of the feedback controls of the multiple motors has a different control characteristic in at least either one of gain and phase from at least another one of the feedback controls.

8. The vehicle speed controller of claim 7, wherein among the feedback controls, a feedback control of a motor driving one front wheel or two front wheels of the wheels and a feedback control of a motor driving one rear wheel or two rear wheels of the wheels have different control characteristics from each other.

9. The vehicle speed controller of claim 7, wherein the different control characteristics are frequency characteristics.

10. The vehicle speed controller of claim 1, wherein the speed signals from the speed sensors are the speed signals that are respectively filtered by speed signal filters for the multiple motors.

11. The vehicle speed controller of claim 1, wherein the processor respectively adds the individual feedforward command torques to the feedback command torques, to control the multiple motors according to command torques that are respectively filtered from the added individual feedforward command torques, by torque filters for the multiple motors.

12. The vehicle speed controller of claim 1, wherein the processor determines, based on an acceleration/deceleration of the vehicle speed indicated by the feedback target vehicle speed signal, a ratio of an individual feedforward command torque to be distributed to a motor driving a front wheel of the wheels or a summation of the individual feedforward command torques to be distributed to motor driving front wheels of the wheels to an individual feedforward command torque to be distributed to a motor driving a rear wheel of the wheels or a summation of the individual feedforward command torques to be distributed to the multiple motors driving rear wheels of the wheels.

13. A vehicle speed control method comprising:
controlling multiple motors driving wheels of a vehicle provided with the multiple motors so that a speed of the vehicle follows a vehicle speed indicated by a target vehicle speed signal being input;
generating feedback command torques for feedback controlling each of the multiple motors, based on a respective deviation between a speed signal from a speed sensor detecting a revolution speed of each of the multiple motors and a feedback target vehicle speed signal obtained by passing the inputted target vehicle speed signal through a target vehicle speed filter, to feedback-control the multiple motors;
calculating a feedforward command torque for feedforward controlling the vehicle using a transfer function whose input is the inputted target vehicle speed signal and whose output is the feedforward command torque for the vehicle;
dividing the feedforward command torque into individual feedforward command torques for distribution to the multiple motors; and
respectively adding the individual feedforward command torques to the feedback command torques for the multiple motors to control the multiple motors,
wherein the transfer function used in calculating the feedforward command torque is a product of a transfer function of the target vehicle speed filter used in generating the feedback command torques multiplied by an inverse model of a transfer function of the vehicle, the transfer function of the vehicle having as an input a summation of forces in a direction of translational motion of the vehicle and whose having as an output the vehicle speed.

* * * * *